(12) United States Patent
Shabi et al.

(10) Patent No.: US 11,138,129 B2
(45) Date of Patent: Oct. 5, 2021

(54) GLOBALLY OPTIMIZED PARTIAL PAGE DEDUPLICATION OF STORAGE OBJECTS

(71) Applicant: EMC IP Holding Company LLC, Hopkinton, MA (US)

(72) Inventors: Uri Shabi, Tel Mond (IL); Ronen Gazit, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/599,501

(22) Filed: Oct. 11, 2019

(65) Prior Publication Data

US 2021/0109865 A1    Apr. 15, 2021

(51) Int. Cl.
G06F 12/1018    (2016.01)
G06F 3/06    (2006.01)
G06F 11/14    (2006.01)

(52) U.S. Cl.
CPC .......... *G06F 12/1018* (2013.01); *G06F 3/064* (2013.01); *G06F 3/067* (2013.01); *G06F 3/0617* (2013.01); *G06F 3/0679* (2013.01); *G06F 11/1469* (2013.01); *G06F 2212/1044* (2013.01); *G06F 2212/152* (2013.01)

(58) Field of Classification Search
CPC .... G06F 12/1018; G06F 3/0617; G06F 3/064; G06F 3/067; G06F 3/0679; G06F 11/1469
See application file for complete search history.

(56) References Cited

U.S. PATENT DOCUMENTS

| | | | |
|---|---|---|---|
| 8,190,850 B1 * | 5/2012 | Davenport | G06F 16/10 711/202 |
| 10,691,355 B2 * | 6/2020 | Kucherov | G06F 3/067 |
| 2021/0133117 A1 * | 5/2021 | Shabi | G06F 12/126 |

OTHER PUBLICATIONS

U.S. Appl. No. 16/177,240, filed Oct. 31, 2018, Wils.
U.S. Appl. No. 16/397,131, filed Apr. 29, 2019, Shabi et al.

* cited by examiner

*Primary Examiner* — Tammara R Peyton
(74) *Attorney, Agent, or Firm* — Daly, Crowley, Mofford & Durkee, LLP (57) ABSTRACT

An aspect of implementing globally optimized partial deduplication of storage objects includes gathering pages that share a common feature, dividing the pages into groups based on commonality with corresponding representative pages, where each is assigned as a representative dedupe page for the corresponding groups. For each group in the groups of pages, an aspect also includes writing the pages to a corresponding physical container.

20 Claims, 5 Drawing Sheets

GLOBALLY OPTIMIZED PARTIAL PAGE DEDUPLICATION OF STORAGE OBJECTS

BACKGROUND

Data optimization techniques reduce system administration and storage overhead costs. One optimization technique is deduplication in which a system eliminates duplicate data across a file system to increase storage, transmission speed, and processing efficiency. Data sent to a storage system can be segmented in fixed- or varying-sized segments in which each segment is provided with an identifier, such as a hash signature or hash of data. Once the identifier is generated it is used to determine if the data segment already exists in the system. If it does, it does not need to be stored again. While data deduplication techniques save on storage space, it can involve overhead costs such as increases in input/output (IO) access overhead.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for globally optimized partial deduplication of storage objects is provided. The method includes gathering pages that share a common feature, dividing the pages into groups based on commonality with corresponding representative pages, where each is assigned as a representative dedupe page for the corresponding groups, and for each group in the groups of pages, writing the pages to a corresponding physical container.

According to aspects of the disclosure, a system for globally optimized partial deduplication of storage objects is provided. The system includes a memory comprising computer-executable instructions and a processor executing the computer-executable instructions, the computer-executable instructions when executed by the processor cause the processor to perform operations. The operations include gathering pages that share a common feature, dividing the pages into groups based on commonality with corresponding representative pages, where each assigned is as a representative dedupe page for the corresponding groups, and for each group in the groups of pages, writing the pages to a corresponding physical container.

According to aspects of the disclosure, a computer program product for globally optimized partial deduplication of storage objects is provided. The computer program product is embodied on a non-transitory computer readable medium, the computer program product including instructions that, when executed by a computer, causes the computer to perform operations. The operations include gathering pages that share a common feature, dividing the pages into groups based on commonality with corresponding representative pages, where each is assigned as a representative dedupe page for the corresponding groups, and for each group in the groups of pages, writing the pages to a corresponding physical container.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)(also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data storage entity and/or storage unit may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit may also refer to one or more virtual disks or virtual LUNs, which may correspond to one or more Virtual Machines. In certain embodiments, a volume refers to a unit of storage on a disk.

In certain embodiments, a storage cluster may refer to a type of configuration that enables stretched clusters (e.g., clusters distributed across different geographic locations). Storage cluster configurations enable entities to provide load balancing and migrations between data centers.

In certain embodiments, Log Structured Storage (LSS) refers to a file system in which data and metadata are written sequentially to a circular buffer, called a log. Log-structured file systems reclaim free space from the tail of the log to prevent the file system from becoming full when the head of the log wraps around to meet it. The tail can release space and move forward by skipping over data for which newer versions exist farther ahead in the log. If there are no newer versions, then the data is moved and appended to the head.

In certain embodiments, a Data Reduction Ratio (DRR) is a measure of the effectiveness of data reduction. DRR reflects the ration of the size of data ingested to the size of the data stored. The size of stored data may be the amount of usable storage capacity consumed by the data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Deduplication operates to reduce capacity and improve data reduction ratios (DRR) by deduping identical user pages and marking it in corresponding metadata structures. Full page deduplication is highly efficient from both performance and capacity aspects as, e.g., a page is fully deduped results in an immediate reduction of the physical utilization, and read performance is also efficient as a single logical page read requires only a single page read.

Partial deduplication is the ability to dedupe pages that are not identical, but also pages that contain a subset of each other's data by deduping some portion of a user page. As such, a partial dedupe user page is built from two parts: portions of a page that represent the unique portion of the page (not deduped); and dedupe portions of page that represent the common (or deduped) sections between the page and other pages.

Partial dedup operations can result in performance and latency reductions (e.g., reduced performance due to the need to read multiple metadata pages and multiple user data pages to reconstruct the original user page, and increased latency due to introduction of new serialization between reads of metadata pages. In addition, other performance and latency issues include suboptimal and local optimization that results in a partial dedup algorithm being sensitive to the order of arrival of the pages, as well as the local decision on the partial dedup and information that is inserted into the index.

The embodiments described herein provide a method to optimize for both performance and global optimization of partial dedup operations, which can lead to an increase in read performance (both IOPs and latency) and an increase in the overall system DRR, which are important parameters of the storage system. In addition, the embodiments optimize performance and increase DRR through globally optimized partial dedupe and aggregation of similar pages into the same metadata (e.g., virtual logical block (VLBs)) and physical containers (e.g., physical logical blocks (PLBs)).

Figure 1:
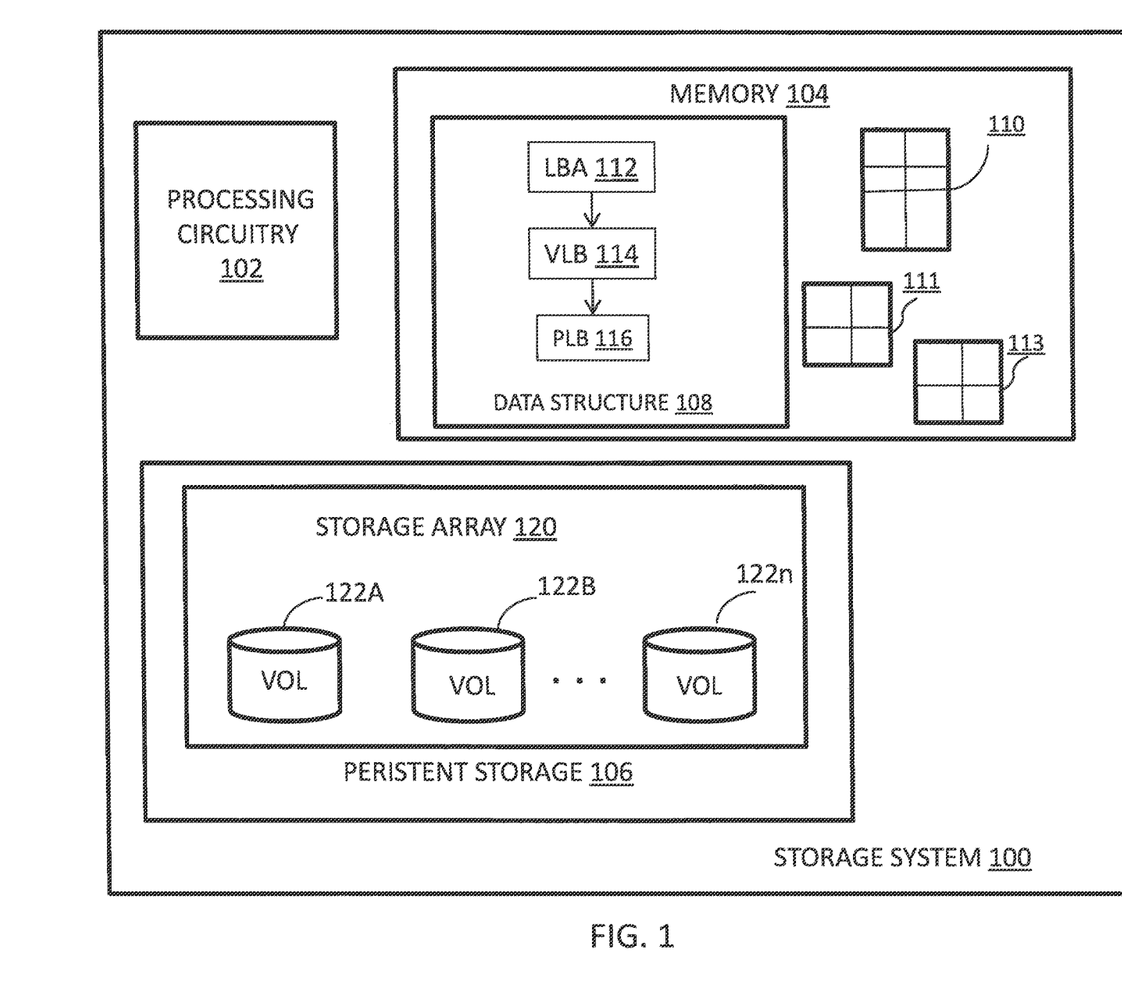
FIG. 1 is a diagram of an example of a storage system according to embodiments.

Turning now to FIG. 1, a system 100 for implementing globally optimized partial deduplication of storage objects in a storage system environment will now be described in accordance with embodiments. The storage system 100 of FIG. 1 includes processing circuitry 102, memory 104, and persistent storage 106. In an embodiment, the persistent storage 106 may be locally installed within the storage system 100, as shown in FIG. 1, or may be an external or remote device that is communicatively coupled to the storage system 100 via a connection (not shown).

If the persistent storage 106 is remote, it may be coupled to the storage system via known connections, interfaces and network circuitry, e.g., Ethernet cables, Wireless Fidelity (Wi-Fi) wireless connections, an IP network, SCSI cables, SATA cables, Fibre Channel (FC) cables, etc. If the connection is a network connection, then interfaces and network circuitry may include, for example, one or more Ethernet cards, cellular modems, FC adapters, Wi-Fi wireless networking adapters, and/or other devices for connecting to a network. If the connection to the persistent storage is a local storage connection, then interface and/or network interface circuitry may include for example, SCSI, SAS, ATA, SATA, FC, and/or other similar controllers and ports.

The persistent storage 106 may include any kind of persistent storage devices, such as, for example, hard disk drives, solid-state storage devices, flash drives, etc. Persistent storage 106 stores user data as volumes 122A-122n, which represents one or more logical disks accessible by users. Volumes 122A-122n are organized and managed with reference to metadata that is stored within various data structures, such as metadata structure 108 in memory 104. In embodiments, the metadata structure 108 includes a top-level node 112 (e.g., a logical block address (LBA) node) that points to a mid-level node 114 (e.g., virtual logical block (VLB)), which in turns points to a low-level node 116 (e.g., a physical address (PLB)). As shown in FIG. 1, by way of non-limiting example, the persistent storage is implemented via a storage array 120. While the unit of data storage is described herein as volumes in a storage array, it is understood that other units of data storage or object storage may be employed to realize the advantages of the embodiments.

The memory 104 also stores a deduplication index 110 for tracking metadata corresponding to blocks subject to compression. A hash table 111 is provided in the memory 104. The hash table 111 contains hashed values of data (e.g., stored as blocks) in the system. For each new unit of data (e.g., page or block), a lookup for a match is performed via the hash table. In addition, the memory 104 stores a page hash data structure 113, which will be described further herein.

The memory 104 may be any kind of digital system memory, such as, for example, random access memory (RAM). Memory 104 stores an operating system (OS, not depicted) in operation (e.g., a Linux, UNIX, Windows, MacOS, or similar operating system). Memory 104 may also stores an input/output (I/O) stack 120 in operation (not shown). The I/O stack allows I/O requests (not depicted) from external hosts (as well as local applications) to be processed with respect to the volume data 122A-122n managed by the storage system 100.

The storage system includes processing circuitry 102, which may be any kind of processor or set of processors configured to perform operations, such as, for example, a microprocessor, a multi-core microprocessor, a digital signal processor, a system on a chip, a collection of electronic circuits, a similar kind of controller, or any combination of the above. It will be understood that the storage system 100 may also include other components as are well-known in the art, including interconnection circuitry. In operation, the processing circuitry 102 may execute one or more application, which may be implemented in logic executable by the processing circuitry.

The processing circuitry 102 is configured to receive and service input/output (IO) requests from one or more external or remote systems (not shown) that are communicatively coupled to the storage system 100. The coupling may be implemented via any type of communication network, such as Internet, local area network, wide area network, and may include wireline and/or wireless technology.

The volumes 122A-122n may be addressable via a logical address that is mapped to a physical address of the array through a three level of indirection scheme that is used to perform address translation during read and write operations with respect to the array.

Partial page deduplication techniques utilize Log Structured Storage (LSS) system having a three-level indirection scheme with respect to storage addressing and is used translate or map (e.g., as a mapper) between layers of storage space:. (i) low-level mappings (leaves) that contain pointers to data, (ii) mid-level mappings that contain pointers to the low-level mappings, and (iii) top-level mappings contain pointers to the mid-level mappings. The low level can be logical block address space (LBA), the mid level can be virtual block address space (VLB), and the top level can be physical address space (PLB). Each of these address spaces reflect a range of addresses. The mapping can be implemented using a data structure that takes a logical address and uses a pointer to point to a VLB address, which in turn points to a physical address (PLB) in which certain data (e.g., such as a page) resides. In log-structured storage systems, the data is stored in contiguous chunks of data, which is referred to as PLB (e.g., 2 MB chunks). The actual user data pages reside inside the PLB and are referenced by the VLB.

The VLB layer is particularly useful in cases of deduplication where a certain page is duplicated multiple times across the logical space (within a single or multiple volumes). In such a case, a single VLB entry is pointed to by multiple logical addresses, as it represents a single page on disk, deduplication for the page is not performed.

Deduplication may be implemented using a unique hash representing a page. The system 100 of FIG. 1 includes a deduplication index 110 in memory 104 that represents most hashes (which in turn represent most unique capacity of the cluster of volumes.

A partial page match occurs when a subpage (e.g., few sectors of the page) match as between two pages (e.g., part of the page are unique and part of the pages are in common).

Figure 2:
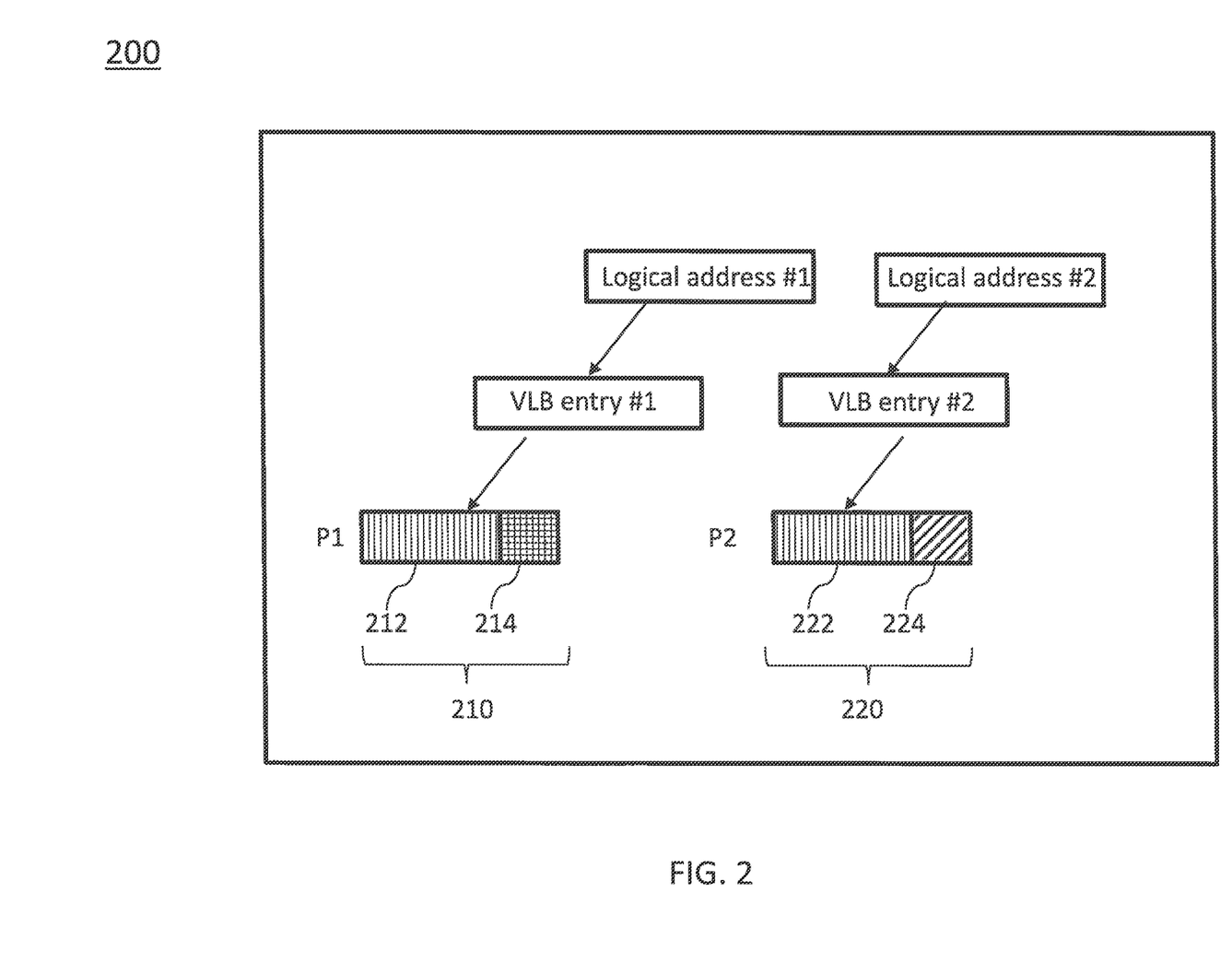
FIG. 2 is a diagram depicting an example metadata data structure.

As an example, logical representation of metadata in a data structure 200 for two partial matching pages (P1 and P2, 210 and 220, respectively) in a cluster for which full page deduplication is performed is shown in FIG. 2. The data structure 200 corresponds to the metadata structure 108 of FIG. 1. As shown in FIG. 2, the two pages P1 and P2 are maintained separately of one another (i.e., no common part of the pages are maintained by the system). The common part of the pages (i.e., represent duplicate data) is shown as 212 and 222. The page P1 also contains data 214 which is not in common with P2. Likewise, the page P2 contains data 224 that is not in common with page P1. Thus, the data stored in part of the page P1 (214) is not a duplicate of the part of the data stored in P2 (224). In the metadata structure 200 of FIG. 2, for page P1 (210), a logical address #1 for the page points to a VLB entry #1, which in turns points to the page P1. Also in the metadata structure 200 of FIG. 2, for page P2 (220), a logical address #2 for the page points to a VLB entry #2, which in turn points to the page P2.

Performance Reduction Due to Partial Deduplication.

To satisfy a user read operation of a partial dedupe page, the system must read both physical portions (a unique portion and a dedup portion) and construct the logical page out of both pages. Dedupe is usually performed prior to flushing a new page into a permanent store. The process of dedupe looks for similarities with previously seen pages (e.g., via hash table lookup where each hash represents a unique page in the permanent store). This operation may involve the two parts of a partially deduped page residing in remote physical stores. As such, the read performance of the system as may be reduced for a user read I/O operation as the storage system needs to submit multiple read requests from remote areas in the store to reconstruct the full page. In addition, in modern storage systems, a metadata layer (e.g., a VLB) may be implemented in which the logical (mapper) part of the metadata is separated from the physical part. Each physical page has a representation in this VLB layer and as a result, reading additional physical page information means that there is a need to also read the associated additional VLB page. Thus, in simple cases, fulfilling a user read operation of a non-dedupe or a fully deduped page requires reading two pages (i.e., the VLB and the page itself); however, for partially deduped pages, four pages (2×VLB and 2×pages) may be read. This may set a read latency increase and can potentially cause a reduction of read IOPS because of the excessive read operations. Further, the point in which a page is represented as a partial dedupe (and pointing to two pages) is within the VLB page itself. As a result, the need to lock and read another VLB is sequential to the previous VLB and this introduces a serialization point of operation (reduces parallelism) and results in additional latency and reduced performance.

Example Read Sequence.

T0-3 represents the time to process and to complete page read (multiple independent pages may be read at the same time as long as we have their meta-data and location).

For non-dedupe or full page dedupe:
T0:
   Lock mapper and read page
      Get VLB representing page (e.g., VLB1)
T1:
   Lock VLB1 and read page
      Get physical page location
T2:
   Read unique part of page As can be seen, the latency here is three sequential pages read (i.e., mapper, VLB, page).

For partial dedupe page:
T0:
   Lock mapper and read page
      Get VLB representing page (e.g., VLB1)
T1:
   Lock VLB1 and read page
      Discover page is partially deduped
      Get VLB of the other page that represent the dedupe part (e.g., VLB2)
      Get physical page location (unique part)
T2:
   Read unique part of page
   Lock and read VLB2
      Get physical page location (dedupe part)
T3:
   Read dedupe part of page The latency here is four sequential pages read (mapper, VLB1, unique page+VLB2, dedupe page).

In this scenario, there is an increased number of backend sequential reads (reflected to latency) introduced to frontend user read requests.

To summarize, partial dedupe can be a good solution on the capacity reduction front, but it may be a cause of performance reduction in terms of both IOPS reduction and increased latency.

Sub-Optimal and Local Optimization Resulting in the Partial Dedupe Algorithm

The process of full page dedupe is simple and is not sensitive to page ordering. Whichever page arrives first is put into the dedupe index, and used as the anchor for subsequent pages that are identical to this page. For partial dedupe, however, the results are highly sensitive to ordering and local decision. For example, if a section is used o identify similar pages, two pages having only one section that is identical may be deduped, and in doing partial dedupe there may only be a minimal increase in the DRR. If later on another page comes along that shares more sections with the second page, it would have been beneficial to modify the original decision and create a new dedupe chain.

In embodiments, partial dedupe is performed page by page as pages are flushed into the system, and partial dedupe is performed as a local optimization without looking at the big picture, which means that the order of arrival of the pages may determine the resulting DRR.

The embodiments described herein perform global optimization for all pages that share a similar portion of the page (e.g., it optimizes all pages that have a common sector). In doing so, the following can be achieved: finding the best way to represent partial dedupe by looking at all pages at the same time and selecting the best pages to be the source of dedupe; and once all pages are simultaneously optimized, they are written to the same physical container (e.g., PLB) that is represented by a single VLB. In doing so, both goals of improving capacity reduction and reducing the performance hit due to partial dedupe can be achieved.

Figure 3:
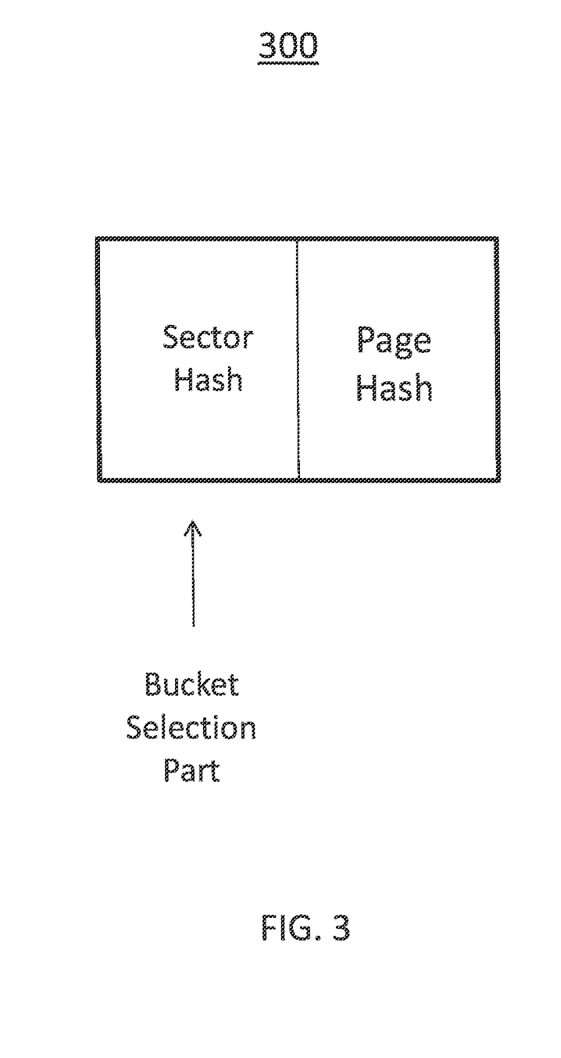
FIG. 3 is a diagram depicting an example page hash structure according to embodiments.
Figure 4:
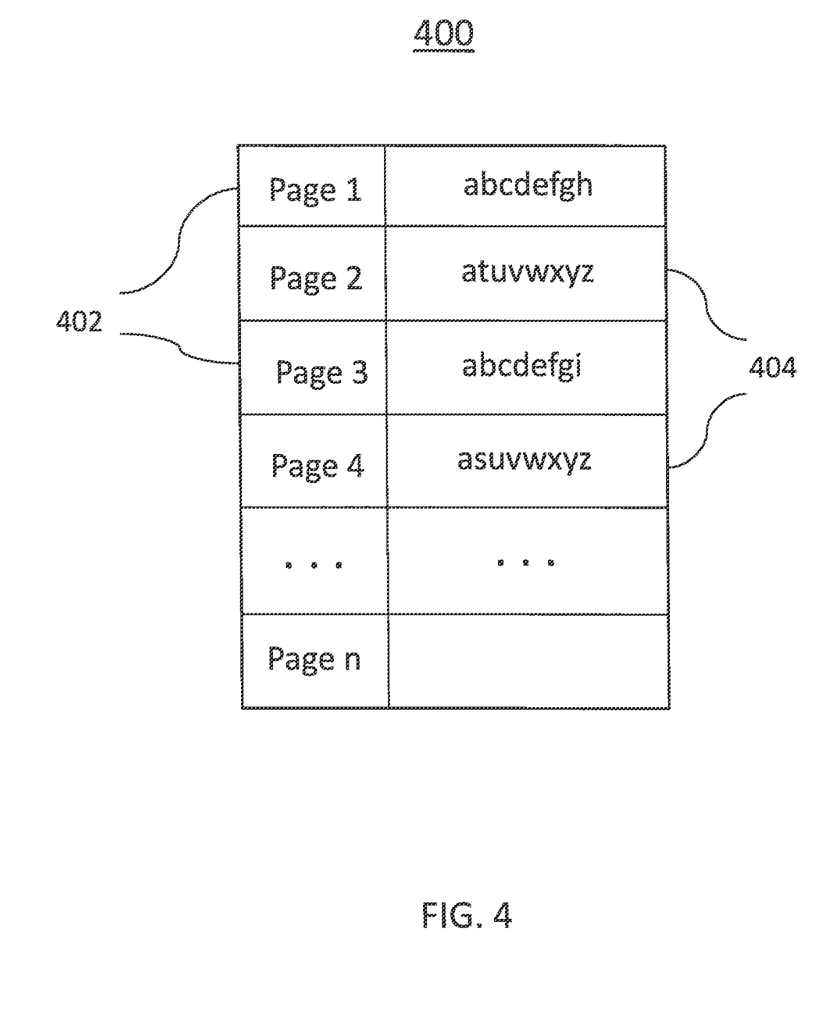
FIG. 4 is a diagram depicting an example set of pages and corresponding sector hashes according to embodiments.
Figure 5:
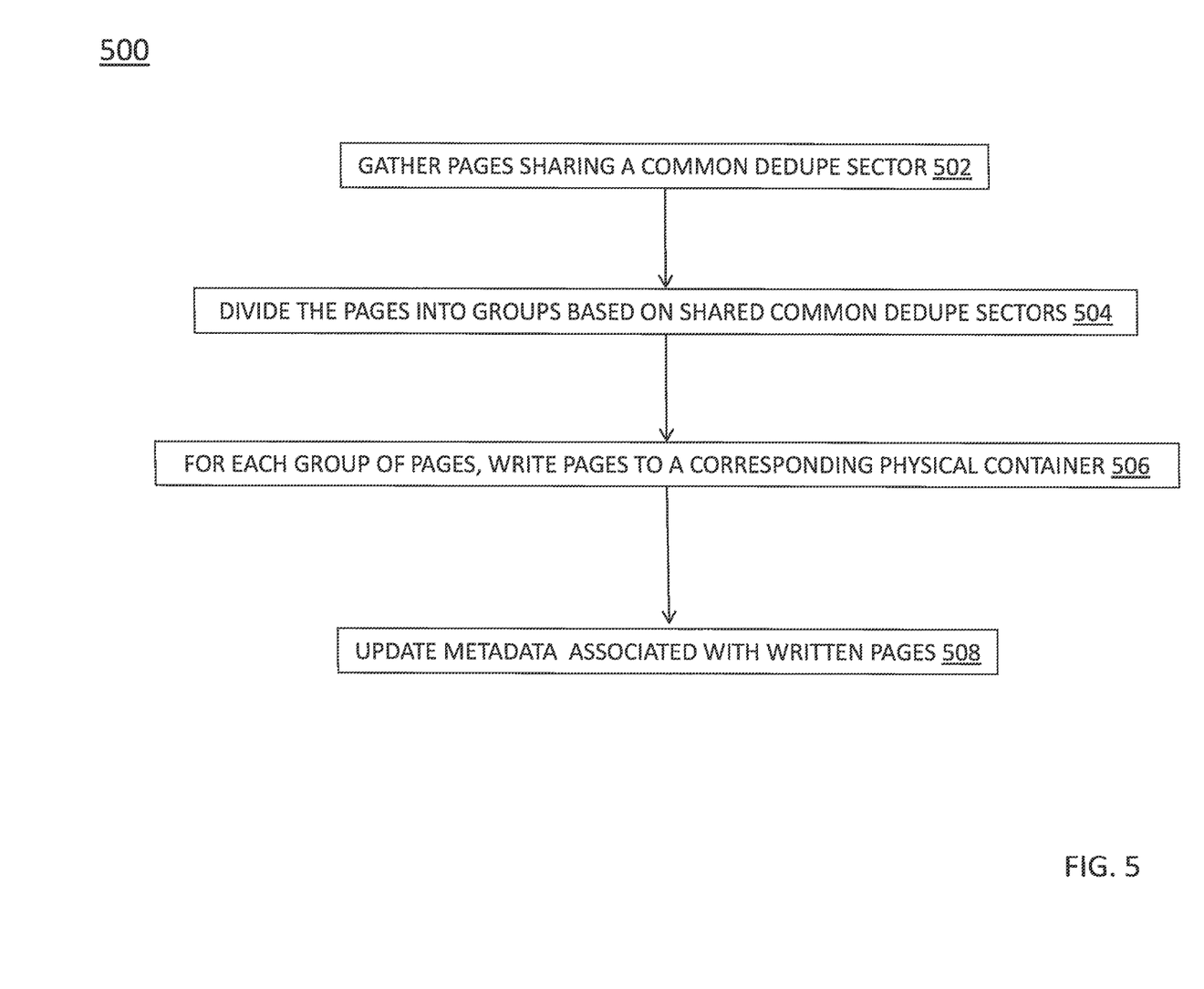
FIG. 5 is a flowchart of a process according to embodiments.

Turning now to FIGS. 3-5, two data structures and a process for performing the embodiments will now be described. The data structure of FIG. 3 depicts a page hash structure and the data structure of FIG. 4 depicts a page/sector hash structure 400. The process 500 begins in block 502, which gathers all of the pages that share a common feature. In certain embodiments, the common feature may be a common dedupe sector. In block 504, the pages are divided into groups based on a shared commonality to a page representing a dedupe page for the group. The representative page serves as an anchor for subsequent pages that are identical to this page. A group is built by gathering all pages with high commonality (as determined by common sector hashes) to the single page acting as the dedupe part of the group. This has a potential to improve DRR as we decide globally for all pages with similarity.

In block 506, the process 500 writes pages belonging to the same group in physical proximity of the same metadata page (VLB) pointing to the same physical container (PLB), and in block 508, metadata associated with the written pages is updated.

The process may be performed bucket by bucket in a lazy update process that is doing global decisions for similar pages that have sectors in common.

Gathering Pages

The page gathering may be accomplished using a dedupe index that is built by sector and page hashes. This is described in commonly assigned U.S. patent application Ser. No. 16/397,131, entitled "Sub-Block Deduplication Using Sector Hashing," filed on Apr. 29, 2019, the entire contents are incorporated by reference in its entirety.

To achieve proximity, there is a need for a page hash structure that will have similarity with another page that has the same sector. As page hash structure 300 is shown in FIG. 3. The page hash structure 300 corresponds to the page hash structure 113 of FIG. 1.

By controlling the amount of sector hash bits versus the number of bucket selection bits, the proximity of page hashes to go in the same bucket can be controlled (or maximum at $2^n$ bucket away where n is number of page hash within the bucket selection bits—e.g., sector hash bits>=bucket hash selection bits, all pages are in the same bucket).

Dividing Pages into Groups

By calculating the hash for every sector in a page and representing each page with its sector hashes, pages can be combined into groups based on the amount of similar hashes. An example page/hash structure 400 is shown in FIG. 4.

Considering the example sector hashes in FIG. 4, in which each letter represents a different hash, a first sector (hash a) is the same and it is possible they have been partially deduped among the pages 2-4 and page 1. Using the process 500, these pages can be divided into two groups 402 (pages 1, 3) and 404 (pages 2, 4). This grouping enables a more efficient partial dedupe as the groups share common sectors.

Writing Pages in Proximity

Once there are enough pages to fill a physical container, the pages are written (block 506), and the metadata for the pages is updated (block 508). In case a physical container is represented by multiple metadata pages (VLB), the pages may be written in an order where a group of pages is written to a single metadata page. In doing so, this guarantees read performance by reducing a sequential VLB page read.

While certain embodiments may be described herein with respect to a mapping scheme that is directed to top/mid/leaf level nodes, it will be understood that other logical mapping schemes may be employed in order to realize the advantages of the embodiments described herein.

Figure 6:
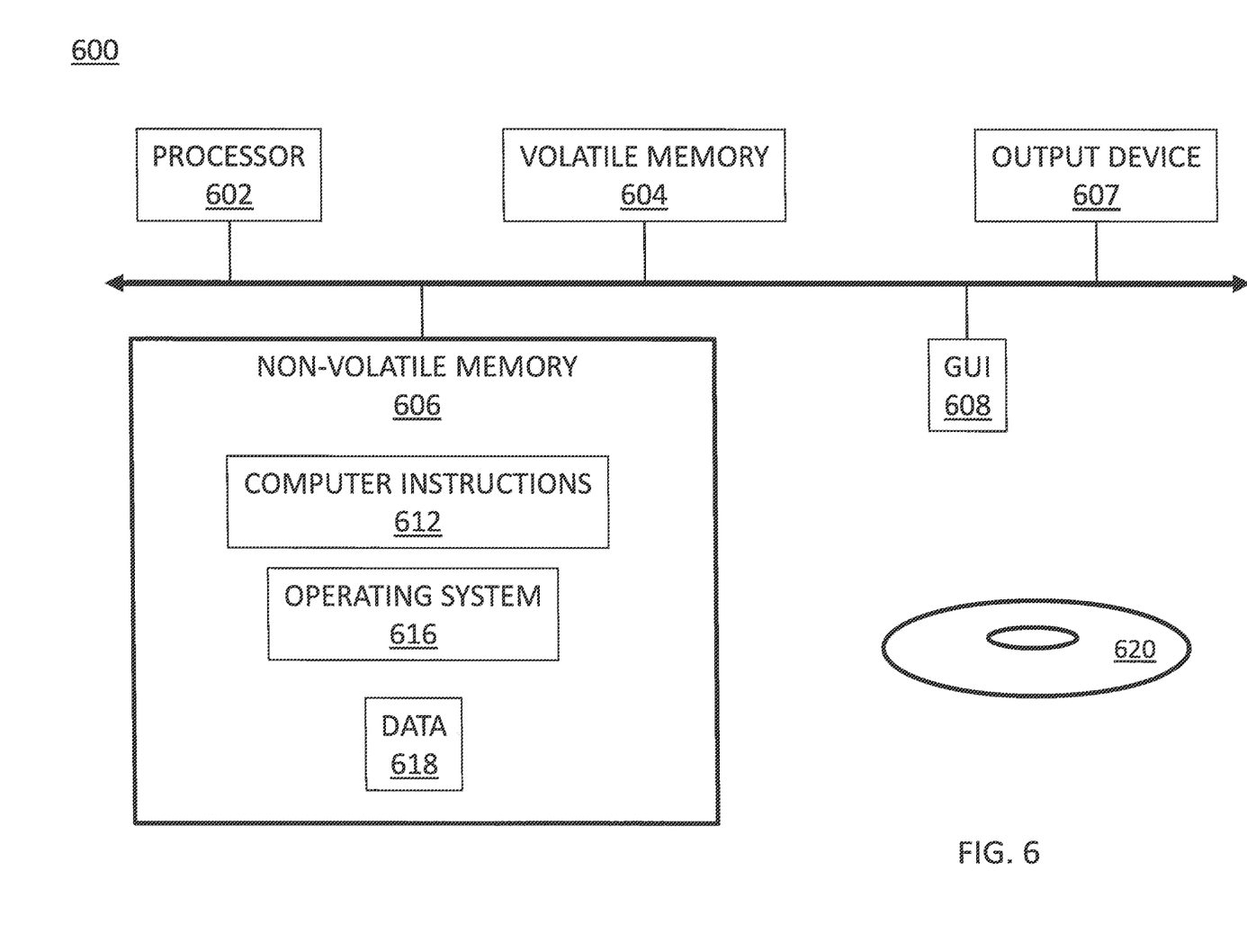
FIG. 6 is a diagram of an example of a computing device according to embodiments.

FIG. 6 shows an exemplary computer 600 (e.g., physical or virtual) that can perform at least part of the processing described herein. The computer 600 includes a processor 602, a volatile memory 604, a non-volatile memory 606 (e.g., hard disk or flash), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

The invention claimed is:

1. A method for implementing optimized partial deduplication of storage objects, the method comprising:
   gathering pages that share a common feature;
   dividing the pages into groups based on commonality with corresponding representative pages, each assigned as a representative dedupe page for the corresponding groups; and
   for each group in the groups of pages, writing the pages to a corresponding physical container.

2. The method of claim 1, wherein the common feature is a common dedupe sector, and gathering the pages includes identifying at least one page hash in a sector of the page that shares a same hash as a sector from another page.

3. The method of claim 2, further comprising:
   calculating the page hash for each dedupe sector in a page and representing each page with corresponding sector hashes; wherein dividing pages into groups is based on a number of identical hashes.

4. The method of claim 3, wherein the page hash contains multiple sector hashes for each page in the page hash.

5. The method of claim 1, wherein the physical container is a physical logical block.

6. The method of claim 1, further comprising:
   updating metadata for written pages in a mid-level storage space.

7. The method of claim 6, wherein the mid-level storage space is a virtual logical block.

8. A system for implementing optimized partial deduplication of storage objects, the system comprising:
   a memory comprising computer-executable instructions; and
   a processor executing the computer-executable instructions, the computer-executable instructions when executed by the processor cause the processor to perform operations comprising:
   gathering pages that share a common feature;
   dividing the pages into groups based on commonality with corresponding representative pages, each assigned as a representative dedupe page for the corresponding groups; and
   for each group in the groups of pages, writing the pages to a corresponding physical container.

9. The system of claim 8, wherein the common feature is a common dedupe sector, and gathering the pages includes identifying at least one page hash in a sector of the page that shares a same hash as a sector from another page.

10. The system of claim 9, wherein the operations further include:

calculating the page hash for each dedupe sector in a page and representing each page with corresponding sector hashes; wherein dividing pages into groups is based on a number of identical hashes.

11. The system of claim 10, wherein the page hash contains multiple sector hashes for each page in the page hash.

12. The system of claim 10, wherein the physical container is a physical logical block.

13. The system of claim 10, wherein the operations further include:
updating metadata for written pages in a mid-level storage space.

14. The system of claim 13, wherein the mid-level storage space is a virtual logical block.

15. A computer program product for implementing optimized partial deduplication of storage objects, the computer program product embodied on a non-transitory computer readable medium, and the computer program product including instructions that, when executed by a computer, causes the computer to perform operations, the operations including:
gathering pages that share a common feature;
dividing the pages into groups based on commonality with corresponding representative pages, each assigned as a representative dedupe page for the corresponding groups; and
for each group in the groups of pages, writing the pages to a corresponding physical container.

16. The computer program product of claim 15, wherein the common feature is a common dedupe sector, and gathering the pages includes identifying at least one page hash in a sector of the page that shares a same hash as a sector from another page.

17. The computer program product of claim 16, wherein the operations further include:
calculating the page hash for each dedupe sector in a page and representing each page with corresponding sector hashes; wherein dividing pages into groups is based on a number of identical hashes.

18. The computer program product of claim 17, wherein the page hash contains multiple sector hashes for each page in the page hash.

19. The computer program product of claim 15, wherein the physical container is a physical logical block.

20. The computer program product of claim 1, wherein the operations further include:
updating metadata for written pages in a mid-level storage space;
wherein the mid-level storage space is a virtual logical block.

* * * * *